(12) United States Patent
Tsujii

(10) Patent No.: US 10,483,841 B2
(45) Date of Patent: Nov. 19, 2019

(54) MOTOR VEHICLE

(71) Applicant: TOYOTA JIDOSHA KABUSHIKI KAISHA, Toyota-shi, Aichi-ken (JP)

(72) Inventor: Shintaro Tsujii, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/955,242

(22) Filed: Apr. 17, 2018

(65) Prior Publication Data

US 2018/0337593 A1 Nov. 22, 2018

(30) Foreign Application Priority Data

May 19, 2017 (JP) .................................. 2017-099757

(51) Int. Cl.
*H02P 1/00* (2006.01)
*H02M 1/38* (2007.01)
*H02P 27/06* (2006.01)
*H02M 3/158* (2006.01)
*H02M 7/797* (2006.01)
*B60L 50/51* (2019.01)
(Continued)

(52) U.S. Cl.
CPC ............... *H02M 1/38* (2013.01); *B60L 3/003* (2013.01); *B60L 50/51* (2019.02); *B60L 50/60* (2019.02); *H02M 3/158* (2013.01); *H02M 7/797* (2013.01); *H02P 27/06* (2013.01); *B60L 2210/40* (2013.01); *B60L 2220/40* (2013.01); *B60L 2240/529* (2013.01); *B60L 2260/165* (2013.01); *H02M 7/5387* (2013.01); *H02M 2001/007* (2013.01); *H02M 2001/008* (2013.01); *H02M 2001/385* (2013.01); *H02P 2201/09* (2013.01)

(58) Field of Classification Search
CPC ...... H02P 27/06; H02P 2201/09; H02M 1/38; H02M 7/5387; H02M 3/158; H02M 2001/385; B60L 11/1803
USPC ....................................................... 318/139
See application file for complete search history.

(56) References Cited

U.S. PATENT DOCUMENTS

| 7,855,901 B2 * | 12/2010 | Oyobe ................. B60L 11/123 318/803 |
| 7,891,451 B2 * | 2/2011 | Oyobe ................. B60K 6/445 180/65.275 |

(Continued)

FOREIGN PATENT DOCUMENTS

| JP | 2011-030343 A | 2/2011 |
| JP | 2011-125129 A | 6/2011 |

OTHER PUBLICATIONS

Machine translation for JP 2011-125129.*

*Primary Examiner* — Bickey Dhakal
*Assistant Examiner* — Gabriel Agared
(74) *Attorney, Agent, or Firm* — Sughrue Mion, PLLC

(57) ABSTRACT

In a process of cancelling shutdown of a second converter during transmission of electric power between a first power line and a second power line with voltage conversion by a first converter in a shutdown state of the second converter, a motor vehicle performs single element switching control that switches one switching element between third and fourth switching elements of the second converter while setting the other switching element off, such as to prevent an electric current in a reverse direction to an electric current flowing in a first reactor of the first converter from flowing in a second reactor of the second converter.

10 Claims, 6 Drawing Sheets

(51) Int. Cl.
  *B60L 3/00* (2019.01)
  *B60L 50/60* (2019.01)
  *H02M 7/5387* (2007.01)
  *H02M 1/00* (2006.01)

(56) References Cited

U.S. PATENT DOCUMENTS

| | | | | |
|---|---|---|---|---|
| 2007/0210651 | A1* | 9/2007 | Ichinose | H02P 9/007 |
| | | | | 307/64 |
| 2007/0247770 | A1* | 10/2007 | Ishikawa | B60L 3/0069 |
| | | | | 361/47 |
| 2016/0250947 | A1* | 9/2016 | Niimi | B60L 3/003 |
| | | | | 701/22 |
| 2016/0264001 | A1* | 9/2016 | Tsujii | B60L 3/0069 |

\* cited by examiner

MOTOR VEHICLE

CROSS-REFERENCE TO RELATED APPLICATION

This application claims priority to Japanese Patent Application No. 2017-099757 filed on May 19, 2017, the contents of which is incorporated herein by reference.

TECHNICAL FIELD

The present disclosure relates to a motor vehicle, and more specifically relates to a motor vehicle equipped with a motor, a first power storage device, a first converter, a second power storage device and a second converter.

BACKGROUND

A proposed configuration of a motor vehicle uses two converters to step up the voltage of an electric power from two batteries and supply the electric power of the stepped-up voltage to a motor (as described in, for example, JP 2011-125129A). When one converter can cover the electric power that is to be supplied to the motor, the motor vehicle of this configuration shuts down the other converter for the purpose of reducing the power consumption. In a process of cancelling this shutdown of the other converter, when the electric current flowing in the other converter exceeds a predetermined current value, a duty cycle is subjected to feedback control such that the electric current flowing in the other converter becomes equal to or less than the predetermined current value. This suppresses an excessive electric current from flowing in the converter in the process of cancelling shutdown of the converter.

Citation List

Patent Literature

PTL 1: JP2011-125129A

SUMMARY

In the motor vehicle of the above configuration, however, an excessive electric current is likely to flow in the converter in the process of cancelling shutdown of the converter. Switching control generally provides a dead time. The presence of the dead time is likely to increase the electric current flowing in the converter. A voltage sensor and a current sensor provided in the system generally have detection errors. The electric current flowing in the converter is likely to increase by values corresponding to such detection errors. Superposition of the dead time with the detection errors of the sensors causes an excessive electric current to flow in the converter.

A motor vehicle of the present disclosure mainly aims to suppress an excessive electric current from flowing in a converter in a process of cancelling shutdown of the converter.

In order to achieve the above primary object, the motor vehicle of the disclosure is implemented by an aspect described below.

The present disclosure is directed to a motor vehicle. The motor vehicle includes a motor for driving, a power storage device, a first converter connected with a first power line which the motor is connected with, and a second power line which the power storage device is connected with, the first converter including first and second switching elements, first and second diodes and a first reactor and being configured to transmit electric power between the first power line and the second power line with voltage conversion, a second converter connected with the first power line and a third power line which the power storage device is connected with and which is different from the second power line, the second converter including third and fourth switching elements, third and fourth diodes and a second reactor and being configured to transmit electric power between the first power line and the third power line with voltage conversion, and a control device configured to perform voltage control of the first converter such that a voltage of the first power line becomes equal to a target voltage and to perform current control of the second converter such that an electric current flowing in the second reactor becomes equal to a target current. In a process of cancelling shutdown of the second converter during transmission of electric power between the first power line and the second power line with the voltage conversion by the first converter in a shutdown state of the second converter, the control device performs single element switching control that switches one switching element between the third and the fourth switching elements of the second converter while setting the other switching element off, such as to prevent an electric current in a reverse direction to an electric current flowing in the first reactor from flowing in the second reactor.

The motor vehicle of this aspect performs the voltage control of the first converter such that the voltage of the first power line becomes equal to the target voltage, and performs the current control of the second converter such that the electric current flowing in the second reactor becomes equal to the target current. In the process of cancelling shutdown of the second converter during transmission of electric power between the first power line and the second power line with voltage conversion by the first converter in the shutdown state of the second converter, the motor vehicle of this aspect performs the single element switching control that switches one switching element between the third and the fourth switching elements of the second converter while setting the other switching element off, such as to prevent the electric current in the reverse direction to the electric current flowing in the first reactor from flowing in the second reactor. Performing the single element switching control enables the electric current flowing in the second reactor to increase from the value 0 without causing the electric current in the reverse direction to flow in the second reactor. As a result, this suppresses an excessive electric current from flowing in the second converter.

DESCRIPTION OF EMBODIMENTS

The following describes aspects of the present disclosure with reference to some embodiments.

Embodiment

Figure 1:
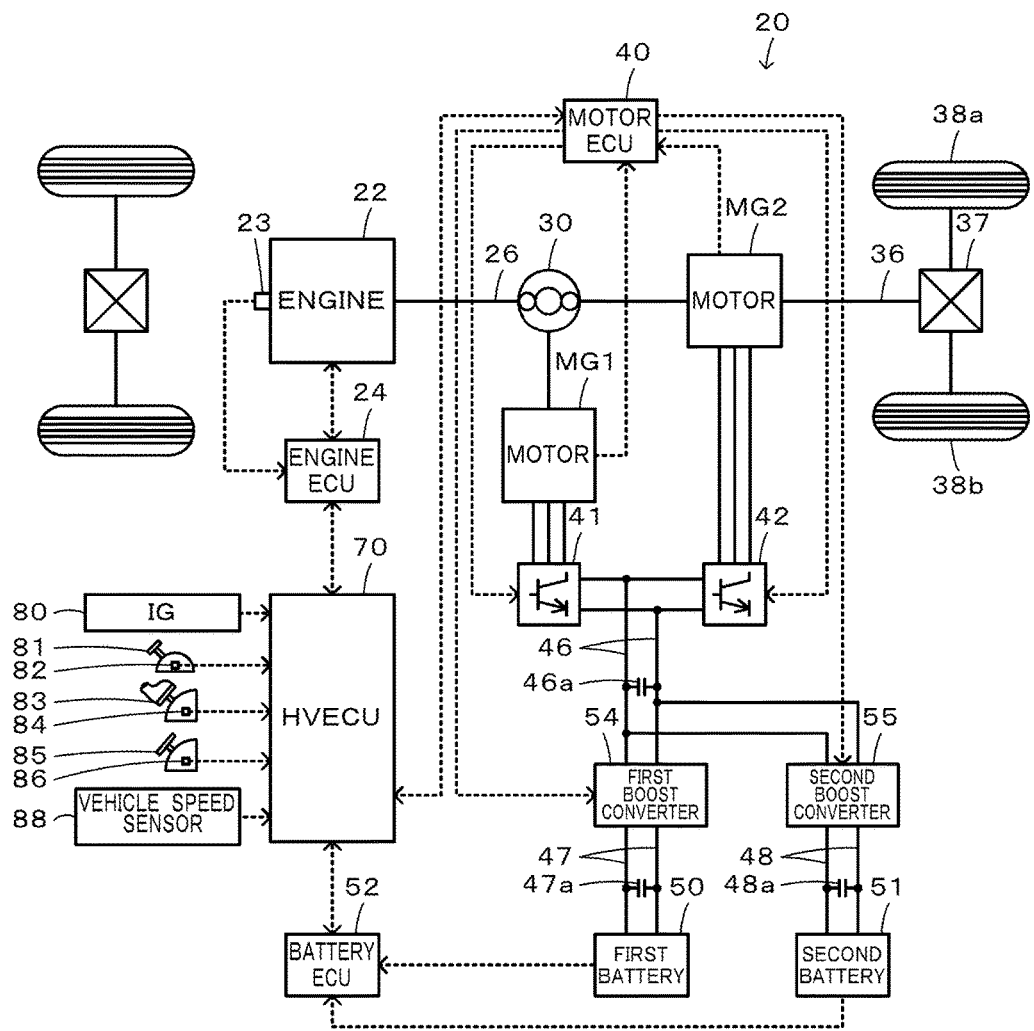
FIG. 1 is a configuration diagram illustrating the schematic configuration of a hybrid vehicle according to one embodiment of the present disclosure.

FIG. 1 is a configuration diagram illustrating the schematic configuration of a hybrid vehicle 20 according to one embodiment of the present disclosure. As illustrated, the hybrid vehicle 20 of the embodiment includes an engine 22, a planetary gear 30, motors MG1 and MG2, inverters 41 and 42, first and second boost converters 54 and 55, first and second batteries 50 and 51, and a hybrid electronic control unit (hereinafter referred to as HVECU) 70.

The engine 22 is configured as an internal combustion engine to output power using, for example, gasoline or light oil as a fuel. This engine 22 is operated and controlled by an engine electronic control unit (hereinafter referred to as engine ECU) 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26, are input into the engine ECU 24 via the input port. Various control signals for operation control of the engine 22 are output from the engine ECU 24 via the output port. The various control signals include, for example, a driving signal to a fuel injection valve, a driving signal to a throttle motor configured to regulate the position of a throttle valve, and a control signal to an ignition coil integrated with an igniter. The engine ECU 24 is connected with the HVECU 70 via the respective communication ports. This engine ECU 24 operates and controls the engine 22, in response to control signals from the HVECU 70. The engine ECU 24 also outputs data regarding the operating conditions of the engine 22 to the HVECU 70 as needed basis.

The engine ECU 24 calculates a rotation speed of the crankshaft 26, i.e., a rotation speed Ne of the engine 22, based on the crank angle θcr.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 38a and 38b via a differential gear 37. The planetary gear 30 further includes a carrier that is connected with the crankshaft 26 of the engine 22.

The motor MG1 is configured as a synchronous generator motor including a rotor with permanent magnets embedded therein and a stator with three-phase coils wound thereon. The rotor of this motor MG1 is connected with the sun gear of the planetary gear 30 as described above. The motor MG2 is also configured as a synchronous generator motor like the motor MG1. A rotor of this motor MG2 is connected with the driveshaft 36.

Figure 2:
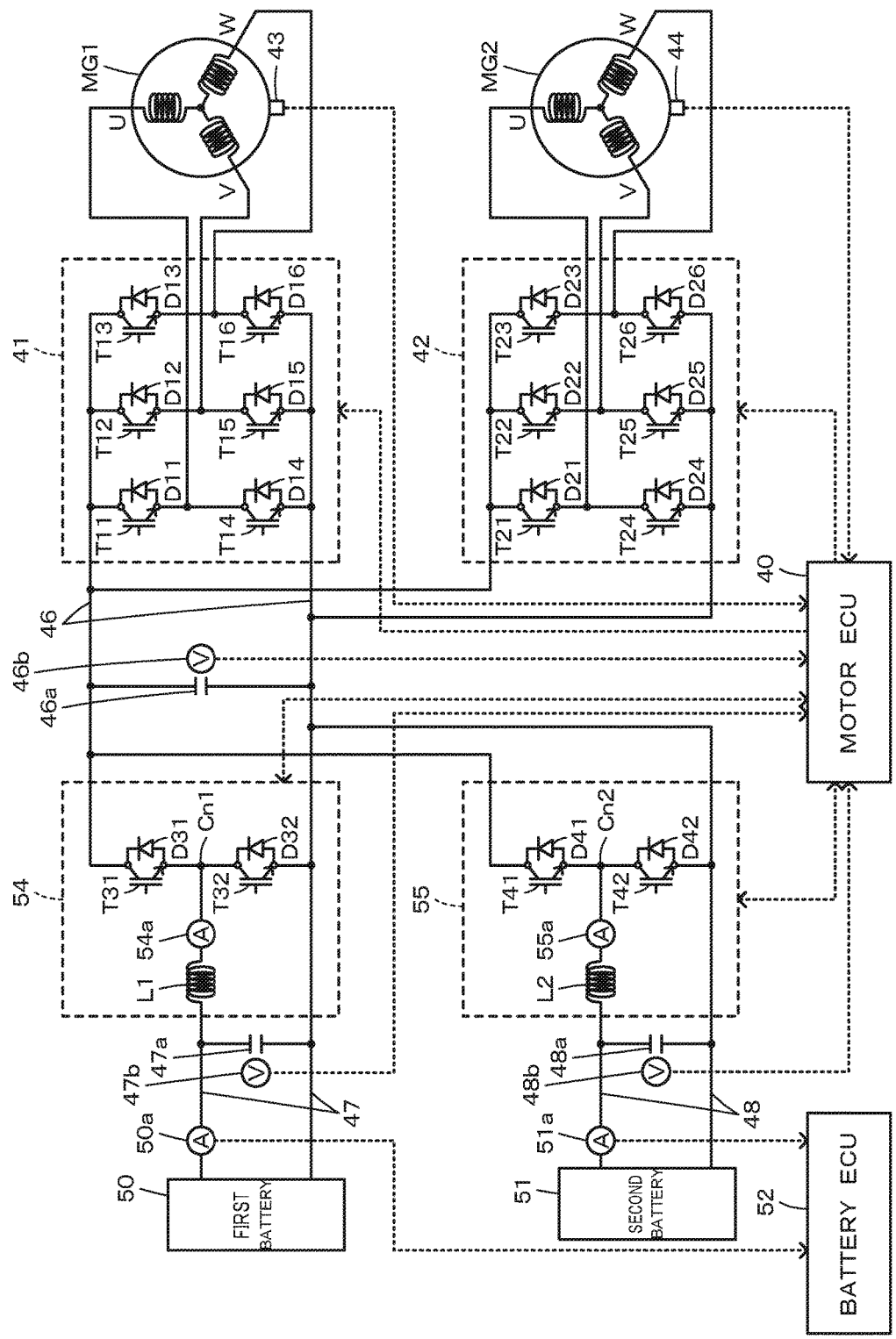
FIG. 2 is a configuration diagram illustrating the schematic configuration of an electric drive system including motors MG1 and MG2.

As shown in FIG. 1 and FIG. 2, the inverter 41 is connected with first power lines 46. This inverter 41 includes six transistors T11 to T16 and six diodes D11 to D16. The transistors T11 to T16 are arranged in pairs, such that two transistors in each pair respectively serve as a source and a sink relative to a positive bus bar and a negative bus bar of the first power lines 46. The six diodes D11 to D16 are connected in parallel to and in a reverse direction to the respective corresponding transistors T11 to T16. The respective phases of the three-phase coils (U phase, V phase and W phase) of the motor MG1 are connected with connection points of the respective pairs of the transistors T11 to T16. When a voltage is applied to the inverter 41, a motor electronic control unit (hereinafter referred to as motor ECU) 40 serves to regulate the rates of ON times of the respective pairs of the transistors T11 to T16, such as to provide a rotating magnetic field in the three-phase coils and thereby rotate and drive the motor MG1.

Like the inverter 41, the inverter 42 includes six transistors T21 to T26 and six diodes D21 to D26. When a voltage is applied to the inverter 42, the motor ECU 40 serves to regulate the rates of ON times of the respective pairs of the transistors T21 to T26, such as to provide a rotating magnetic field in the three-phase coils and thereby rotate and drive the motor MG2.

The first boost converter 54 is connected with the first power lines 46 which the inverters 41 and 42 are connected with, as well as with second power lines 47 which the first battery 50 is connected with. This first boost converter 54 includes two transistors T31 and T32, two diodes D31 and D32 and a reactor L1. The transistor T31 is connected with the positive bus bar of the first power lines 46. The transistor T32 is connected with the transistor T31 and with negative bus bars of the first power lines 46 and the second power lines 47. The two diodes D31 and D32 are connected in parallel to and in a reverse direction to the respective corresponding transistors T31 and T32. The reactor L1 is connected with a connection point Cn1 of the transistors T31 and T32 and with a positive bus bar of the second power lines 47. The motor ECU 40 regulates the rates of ON times of the respective transistors T31 and T32, so that the first boost converter 54 steps up the voltage of an electric power of the second power lines 47 and supplies the electric power of the stepped-up voltage to the first power lines 46, while stepping down the voltage of an electric power of the first power lines 46 and supplying the electric power of the stepped-down voltage to the second power lines 47.

The second boost converter 55 is connected with the first power lines 46, as well as with third power lines 48 which the second battery 51 is connected with. Like the first boost converter 54, the second boost converter 55 includes two transistors T41 and T42, two diodes D41 and D42 and a reactor L2. The motor ECU 40 regulates the rates of ON times of the respective transistors T41 and T42, so that the second boost converter 55 steps up the voltage of an electric power of the third power lines 48 and supplies the electric power of the stepped-up voltage to the first power lines 46, while stepping down the voltage of the electric power of the first power lines 46 and supplying the electric power of the stepped-down voltage to the third power lines 48.

A capacitor 46a for smoothing is mounted to the positive bus bar and the negative bus bar of the first power lines 46. A capacitor 47a for smoothing is mounted to the positive bus bar and the negative bus bar of the second power lines 47. A capacitor 48a for smoothing is mounted to a positive bus bar and a negative bus bar of the third power lines 48.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2 and the first and the second boost converters 54 and 55 are input into the motor ECU 40 via the input port. The signals input from the various sensors include, for example, rotational positions θm and θm2 from rotational position detection sensors configured to detect the rotational positions of the respective rotors of the motors MG1 and MG2 and phase currents from current sensors configured to detect electric currents flowing in the respective phases of the motors MG1 and MG2. The input signals also include a voltage VH of the capacitor 46a (first power lines 46) from a voltage sensor 46b mounted between terminals of the capacitor 46a, a voltage VL1 of the capacitor 47a (second power lines 47) from a voltage sensor 47b mounted between terminals of the capacitor 47a and a voltage VL2 of the capacitor 48a (third power lines 48) from a voltage sensor 48b mounted between terminals of the capacitor 48a. The input signals further include an electric current IL1 of the reactor L1 (hereinafter called first reactor current IL1) from a current sensor 54a mounted between the connection point Cn1 of the transistors T31 and T32 and the reactor L1 in the first boost converter 54 and an electric current IL2 of the reactor L2 (hereinafter called second reactor current IL2) from a current sensor 55a mounted between a connection point Cn2 of the transistors T41 and T42 and the reactor L2 in the second boost converter 55. Various controls signals for drive control of the motors MG1 and MG2 and the first and the second boost converters 54 and 55 are output from the motor ECU 40 via the output port. The various control signals include, for example, switching control signals to the transistors T11 to T16 of the inverter 41 and to the transistors T21 to T26 of the inverter 42 and switching control signals to the transistors T31 and T32 of the first boost converter 54 and to the transistors T41 and T42 of the second boost converter 55. The motor ECU 40 is connected with the HVECU 70 via the respective communication port. This motor ECU 40 drives and controls the motors MG1 and MG2 and the first and the second boost converters 54 and 55, in response to control signals from the HVECU 70. The motor ECU 40 also outputs data regarding the driving conditions of the motors MG1 and MG2 and the first and the second boost converters 54 and 55 to the HVECU 70 as needed basis. The motor ECU 40 also calculates rotation speeds Nm1 and Nm2 of the motors MG1 and MG2, based on the rotational positions θm1 and θm2 of the respective rotors of the motors MG1 and MG2.

The first battery 50 is configured as, for example, a lithium ion rechargeable battery or a nickel metal hydride battery and is connected with the second power lines 47 as described above. The second battery 51 is configured as, for example, a lithium ion rechargeable battery or a nickel metal hydride battery and is connected with the third power lines 48 as described above. The first and the second batteries 50 and 51 are under management of a battery electronic control unit (hereinafter referred to as battery ECU) 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the first and the second batteries 50 and 51 are input into the battery ECU 52 via the input port. The signals from the various sensors include, for example, a battery voltage Vb1 from a voltage sensor placed between terminals of the first battery 50, a battery current Ib1 from a current sensor 50a mounted to an output terminal of the first battery 50, and a battery temperature Tb1 from a temperature sensor mounted to the first battery 50. The input signals also include a battery voltage Vb2 from a voltage sensor placed between terminals of the second battery 51, a battery current Ib2 from a current sensor 51a mounted to an output terminal of the second battery 51, and a battery temperature Tb2 from a temperature sensor mounted to the second battery 51. The battery ECU 52 is connected with the HVECU 70 via the respective communication ports. This battery ECU 52 outputs data regarding the conditions of the first and the second batteries 50 and 51 to the HVECU 70 as needed basis. The battery ECU 52 calculates states of charge SOC1 and SOC2, based on integrated values of the respective battery currents Ib1 and Ib2, with a view to managing the first and the second batteries 50 and 51. The state of charge SOC1 or SOC2 denotes a ratio of the capacity of electric power dischargeable from the first battery 50 or from the second battery 51 at that time to the overall capacity of the first battery 50 or the overall capacity of the second battery 51.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals from the various sensors include, for example, an ignition signal from an ignition switch 80, a shift position SP from a shift position sensor 82 configured to detect an operating position of a shift lever 81, an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 is connected with the engine ECU 24, the motor ECU 40 and the battery ECU 52 via the respective communication ports as described above. This HVECU 70 transmits various control signals and data to and from the engine ECU 24, the motor ECU 40 and the battery ECU 52.

The hybrid vehicle 20 of the embodiment having the above configuration may be driven in a hybrid drive mode (HV drive mode) with operation of the engine 22 or in an electric drive mode (EV drive mode) with stop of operation of the engine 22.

During a drive in the HV drive mode, the HVECU 70 first sets a required torque Tr* that is required for driving (to be output to the driveshaft 36), based on the accelerator position Acc from the accelerator pedal position sensor 84 and the vehicle speed V from the vehicle speed sensor 88. The HVECU 70 subsequently calculates a driving power Pdrv* that is required for driving by multiplying the set required torque Tr* by a rotation speed Nr of the driveshaft 36. The rotation speed Nr of the driveshaft 36 may be the rotation speed Nm2 of the motor MG2 or a rotation speed obtained by multiplying the vehicle speed V by a conversion factor. The HVECU 70 then sets a required power Pe* that is required for the vehicle by subtracting a required charge-discharge power Pb* of the first battery 50 or the second battery 51 (which takes a positive value when the first battery 50 or the second battery 51 is discharged) from the calculated driving power Pdrv*. The required charge-discharge power Pb* is set based on a difference ΔSOC1 or a difference ΔSOC2 between the state of charge SOC1 of the first battery 50 or the state of charge SOC2 of the second battery 51 and a target state of charge SOC1* or a target state of charge SOC2*, such as to reduce the absolute value of the difference ΔSOC1 or the absolute value of the difference ΔSOC2.

The HVECU 70 sets a target rotation speed Ne* and a target torque Te* of the engine 22 and torque commands Tm1* and Tm2* of the motors MG1 and MG2, such that the required power Pe* is output from the engine 22 and that the required torque Tr* is output to the driveshaft 36. The HVECU 70 subsequently sets a target voltage VH* of the first power lines 46, based on a target drive point of the motor MG1 (defined by the torque command Tm1* and the rotation speed Nm1) and a target drive point of the motor MG2 (defined by the torque command Tm2* and the rotation speed Nm2). The HVECU 70 also sets a distribution ratio Dr. The distribution ratio Dr denotes a ratio of an electric power Pc1 that is transmitted between the first battery 50 and the inverters 41 and 42 via the first boost converter 54 to a sum (Pc1+Pc2) of the electric power Pc1 and an electric power Pc2 that is transmitted between the second battery 51 and the inverters 41 and 42 via the second boost converter 55. According to the embodiment, the distribution ratio Dr is set based on the differences ΔSOC1 and ΔSOC2, such that these differences ΔSOC1 and ΔSOC2 are not significantly different from each other. After setting the distribution ratio Dr, the HVECU 70 sets a target current IL2* of the second reactor current IL2 flowing in the reactor L2 of the second boost converter 55, based on the set distribution ratio Dr.

The HVECU 70 sends the target rotation speed Ne* and the target torque Te* of the engine 22 to the engine ECU 24, while sending the torque commands Tm1* and Tm2* of the motors MG1 and MG2, the target voltage VH* of the first power lines 46 and the target current IL2* of the second reactor current IL2 to the motor ECU 40. The engine ECU 24 performs intake air flow control, fuel injection control and ignition control of the engine 22, such as to operate the engine 22 with the target rotation speed Ne* and the target torque Te*. The motor ECU 40 performs switching control of the transistors T11 to T16 of the inverter 41 and the transistors T21 to T26 of the inverter 42, such as to drive the motors MG1 and MG2 with the torque commands Tm1* and Tm2*. In the case of driving the first boost converter 54, the motor ECU 40 performs switching control of the transistors T31 and T32 of the first boost converter 54, such that the voltage VH of the first power lines 46 is made equal to the target voltage VH*. This control is called voltage control. In the case of driving the second boost converter 55, the motor ECU 40 performs switching control of the transistors T41 and T42 of the second boost converter 55, such that the second reactor current IL2 is made equal to the target current IL2*. This control is called current control.

During a drive in the EV drive mode, the HVECU 70 first sets the required torque Tr*, based on the accelerator position Acc from the accelerator pedal position sensor 84 and the vehicle speed V from the vehicle speed sensor 88. The HVECU 70 subsequently sets a value 0 to the torque command Tm1* of the motor MG1 and sets the torque command Tm2* of the motor MG2 such that the required torque Tr* is output to the driveshaft 36. Like during a drive in the HV drive mode, the HVECU 70 then sets the target voltage VH* of the first power lines 46 and the target current IL2* of the second reactor current IL2. The HVECU 70 subsequently sends the torque commands Tm1* and Tm2* of the motors MG1 and MG2, the target voltage VH* of the first power lines 46 and the target current IL1* of the second reactor current IL2 to the motor ECU 40. The motor ECU 40 controls the inverters 41 and 42 and the first and the second boost converters 54 and 55 as described above.

Figure 3:
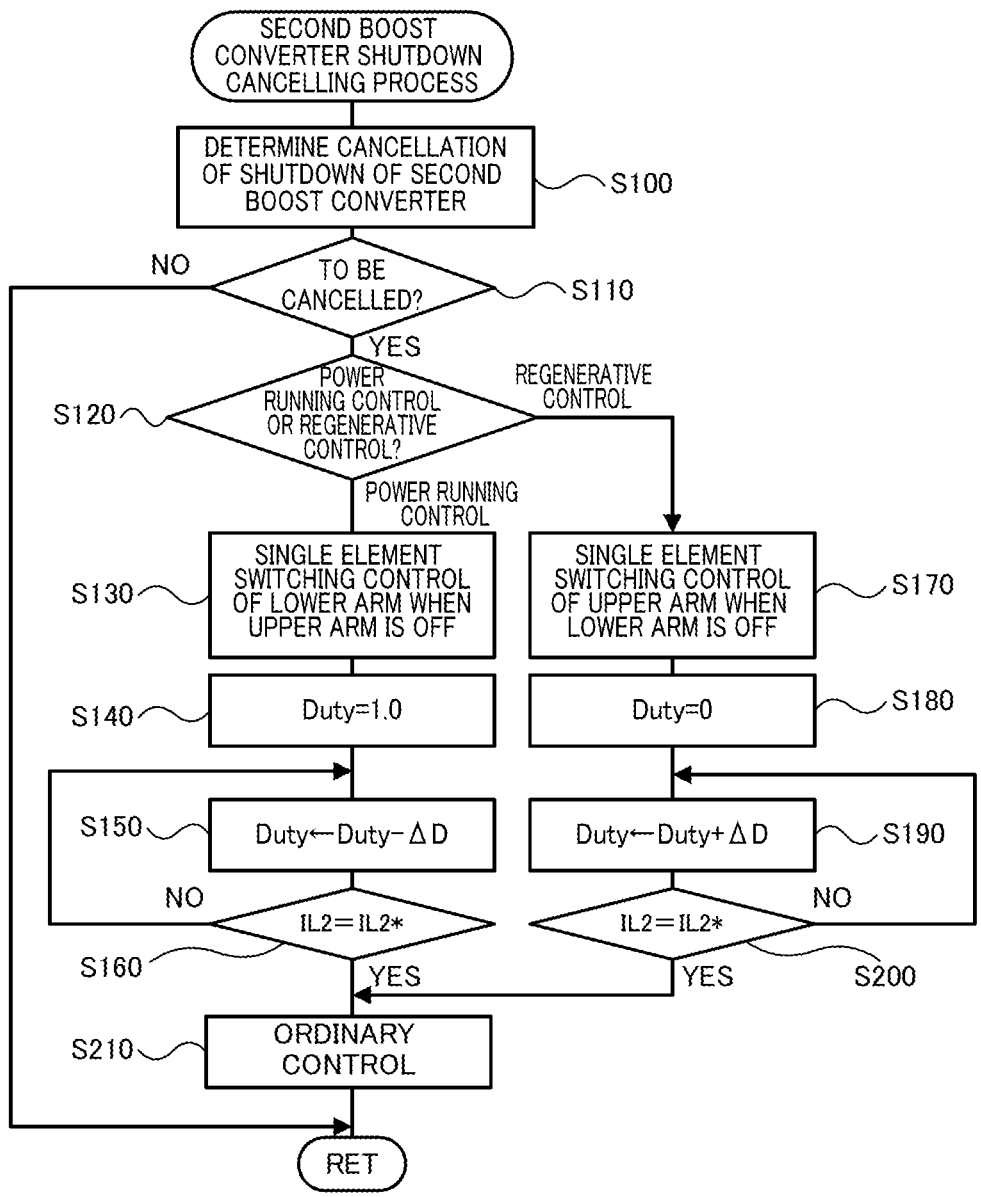
FIG. 3 is a flowchart showing one example of a second boost converter shutdown cancelling process.

In the hybrid vehicle 20 of the embodiment, in the state that the motors MG1 and MG2 are driven with relatively low loads, the motors MG1 and MG2 may be allowed to be driven with only the transmission of electric power by the first boost converter 54 without operation of the second boost converter 55. In this case, the hybrid vehicle 20 of the embodiment shuts down the second boost converter 55 and performs only the voltage control of the first boost converter 54. When the loads of the motors MG1 and MG2 increase and make it difficult to drive the motors MG1 and MG2 with only the transmission of electric power by the first boost converter 54, the hybrid vehicle 20 of the embodiment cancels the shutdown of the second boost converter 55 and drives the motors MG1 and MG2 by ordinary control including both the voltage control of the first boost converter 54 and the current control of the second boost converter 55. The flowchart of FIG. 3 shows one example of a second boost converter shutdown cancelling process performed in this state. This process is repeatedly performed by the motor ECU 40 in the state that the hybrid vehicle 20 shuts down the second boost converter 55 and performs the voltage control of the first boost converter 54.

When the second boost converter shutdown cancelling process is triggered, the motor ECU 40 first determines whether shutdown of the second boost converter 55 is to be cancelled (step S100). This determination is based on determination of whether it is difficult to drive the motors MG1 and MG2 with only the transmission of electric power by the first boost converter 54 and may be, for example, based on determination of whether a drive area of the motors MG1 and MG2 is in a shutdown area of the second boost converter 55 that is determined in advance based on the rotation speed Nm1 and the torque command Tm1* of the motor MG1 and the rotation speed Nm2 and the torque command Tm2* of the motor MG2. When it is determined that shutdown of the second boost converter 55 is not to be cancelled (step S110), the motor ECU 40 immediately terminates this process.

When it is determined that shutdown of the second boost converter 55 is to be cancelled (step S110), on the other hand, the motor ECU 40 determines whether the current control of the first boost converter 54 is power running control that steps up the voltage of the electric power of the second power lines 47 and supplies the electric power of the stepped-up voltage to the first power lines 46 or regenerative control that steps down the voltage of the electric power of the first power lines 46 and supplies the electric power of the stepped-down voltage to the second power lines 47 (step S120). When it is determined that the current control of the first boost converter 54 is the power running control, the motor ECU 40 performs power running-time single element switching control that switches the transistor T42 forming a lower arm of the second boost converter 55 in the state that the transistor T41 forming an upper arm of the second boost converter 55 is off (step S130), and sets a value 1.0 to a duty cycle (step S140). The motor ECU 40 subsequently reduces the duty cycle by a predetermined value ΔD each time until the second reactor current IL2 of the reactor L2 of the second boost converter 55 becomes equal to the target current IL2* (steps S150 and S160). When the second reactor current IL2 becomes equal to the target current IL2*, the motor ECU 40 changes over the control to the ordinary control including both the voltage control of the first boost converter 54 and the current control of the second boost converter 55 (step S210) and terminates this process. The switching of the transistor T42 forming the lower arm in the state that the transistor T41 forming the upper arm is off during the power running control of the first boost converter 54 aims to suppress electric current from flowing in the reactor L2 of the second boost converter 55 in a direction of charging the second battery 51 (i.e., in the regeneration direction) by the voltage of the first power lines 46 when the transistor T41 forming the upper arm is on. This single element switching control causes the electric current gradually increasing from the value 0 in the power running direction to flow in the reactor L2 of the second boost converter 55.

When it is determined at step S120 that the control of the first boost converter 54 is the regenerative control, the motor ECU 40 performs regeneration-time single element switching control that switches the transistor T41 forming the upper arm of the second boost converter 55 in the state that the transistor T42 forming the lower arm of the second boost converter 55 is off (step S170), and sets a value 0 to the duty cycle (step S180). The motor ECU 40 subsequently increases the duty cycle by the predetermined value ΔD each time until the second reactor current IL2 of the reactor L2 of the second boost converter 55 becomes equal to the target current IL2* (steps S190 and S200). When the second reactor current IL2 becomes equal to the target current IL2*, the motor ECU 40 changes over the control to the ordinary control including both the voltage control of the first boost converter 54 and the current control of the second boost converter 55 (step S210) and terminates this process. The switching of the transistor T41 forming the upper arm in the state that the transistor T42 forming the lower arm is off during the regenerative control of the first boost converter 54 aims to suppress electric current from flowing in the reactor L2 of the second boost converter 55 in a direction of discharging the second battery 51 (i.e., in the power running direction) by the voltage of the second battery 51 when the transistor T42 forming the lower arm is on. This single element switching control causes the electric current gradually decreasing from the value 0 in the regeneration direction (i.e., the electric current having the absolute value gradually increasing) to flow in the reactor L2 of the second boost converter 55.

Figure 4:
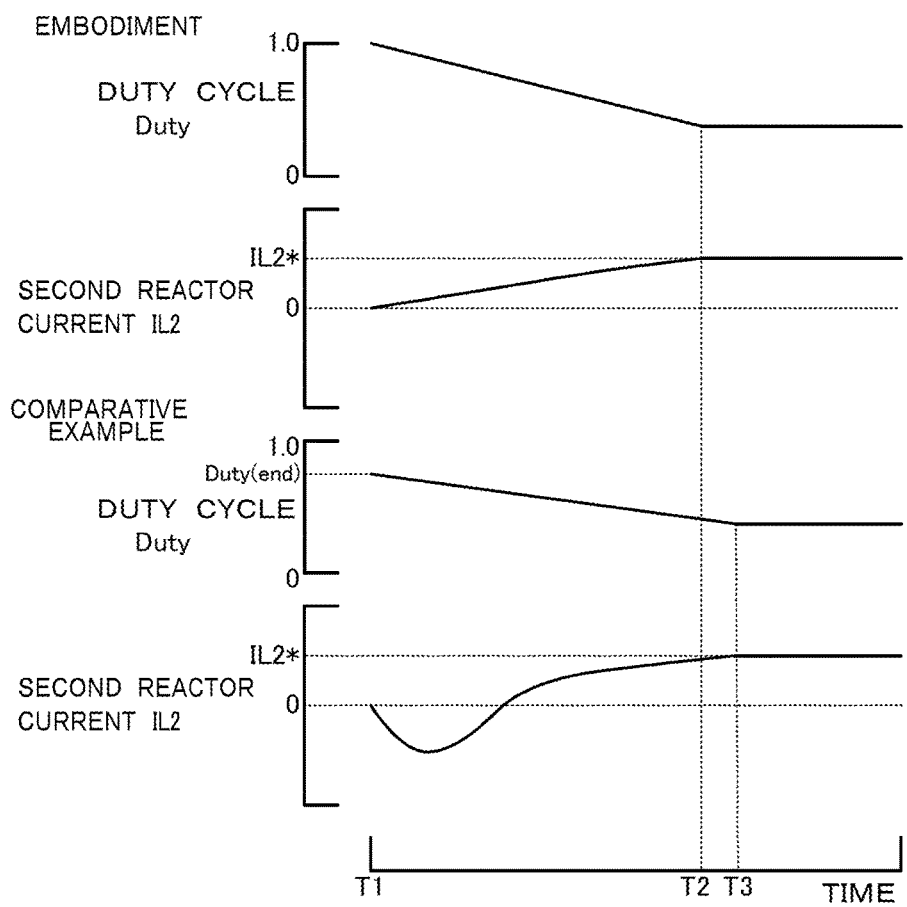
FIG. 4 is a diagram schematically showing time changes of a duty cycle and a second reactor current IL2 of the embodiment and a comparative example when shutdown of a second converter is cancelled during power running control of a first boost converter.

FIG. 4 schematically shows time changes of the duty cycle and the second reactor current IL2 of the embodiment and a comparative example when shutdown of the second converter 55 is cancelled during the power running control of the first boost converter 54. In the comparative example, in the process of cancelling shutdown of the second converter 55, the duty cycle is set to a value Duty(end) provided at the time of shutdown of the second converter 55 as an initial value and is subjected to feedback control such that the second reactor current IL2 becomes equal to the target current IL2*. In the comparative example, at a control start time T1, the initial value of the duty cycle is set to the value Duty(end) provided at the time of shutdown of the second converter 55. This causes the second reactor current IL2 to once significantly increase in the negative direction (i.e., in the regeneration direction). The duty cycle is then subjected to feedback control such that the second reactor current IL2 becomes equal to the target current IL2*. At a time T3, the second reactor current IL2 becomes equal to the target current IL2*. In the embodiment, on the other hand, at the control start time T1, the duty cycle is set to the value 1.0. The duty cycle is then reduced by the predetermined value ΔD each time until the second reactor current IL2 becomes equal to the target current IL2*. This causes the second reactor current IL2 to gradually increase from the value 0. At a time T2, the second reactor current IL2 becomes equal to the target current IL2*.

Figure 5:
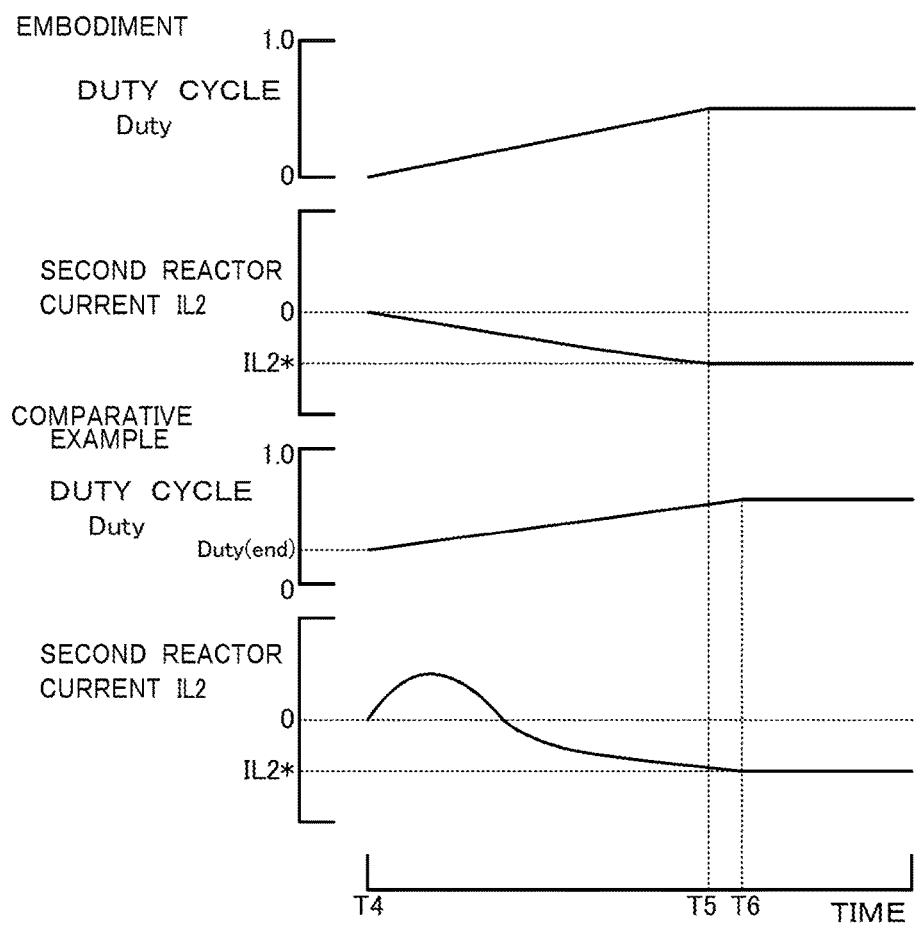
FIG. 5 is a diagram schematically showing time changes of the duty cycle and the second reactor current IL2 of the embodiment and the comparative example when shutdown of the second converter is cancelled during regenerative control of the first boost converter.

FIG. 5 schematically shows time changes of the duty cycle and the second reactor current IL2 of the embodiment and a comparative example when shutdown of the second converter 55 is cancelled during the regenerative control of the first boost converter 54. The comparative example of FIG. 5 is identical with the comparative example of FIG. 4. In the comparative example, at a control start time T4, the initial value of the duty cycle is set to the value Duty(end) provided at the time of shutdown of the second converter 55. This causes the second reactor current IL2 to once significantly increase in the positive direction (i.e., in the power running direction). The duty cycle is then subjected to feedback control such that the second reactor current IL2 becomes equal to the target current IL2*. At a time T6, the second reactor current IL2 becomes equal to the target current IL2*. In the embodiment, on the other hand, at the control start time T4, the duty cycle is set to the value 0. The duty cycle is then increased by the predetermined value ΔD each time until the second reactor current IL2 becomes equal to the target current IL2*. This causes the second reactor current IL2 to gradually decrease (causes the absolute value of the second reactor current IL2 to gradually increase) from the value 0. At a time T5, the second reactor current IL2 becomes equal to the target current IL2*.

As described above, in the process of cancelling shutdown of the second boost converter 55 under operation of the first boost converter 54 with the second boost converter 55 in the shutdown state, during the power running control of the first boost converter 54, the hybrid vehicle 20 of the embodiment performs the power running-time single element switching control that switches the transistor T42 forming the lower arm of the second boost converter 55 in the state that the transistor T41 forming the upper arm is off. The hybrid vehicle 20 of the embodiment also sets the duty cycle to the value 1.0 and reduces the duty cycle by the predetermined value ΔD each time until the second reactor current IL2 of the reactor L2 of the second boost converter 55 becomes equal to the target current IL2*. This causes the electric current gradually increasing from the value 0 in the power running direction to the target current IL2* to flow in the reactor L2 of the second boost converter 55. During the regenerative control of the first boost converter 54, on the other hand, the hybrid vehicle 20 of the embodiment performs the regeneration-time single element switching control that switches the transistor T41 forming the upper arm of the second boost converter 55 in the state that the transistor T42 forming the lower arm is off. The hybrid vehicle 20 of the embodiment also sets the duty cycle to the value 0 and increases the duty cycle by the predetermined value ΔD each time until the second reactor current IL2 of the reactor L2 of the second boost converter 55 becomes equal to the target current IL2*. This causes the electric current gradually decreasing from the value 0 in the regeneration direction to the target current IL2* (i.e., the electric current having the absolute value gradually increasing) to flow in the reactor L2 of the second boost converter 55. As a result, these controls suppress an excessive electric current from flowing in the second boost converter 55.

Figure 6:
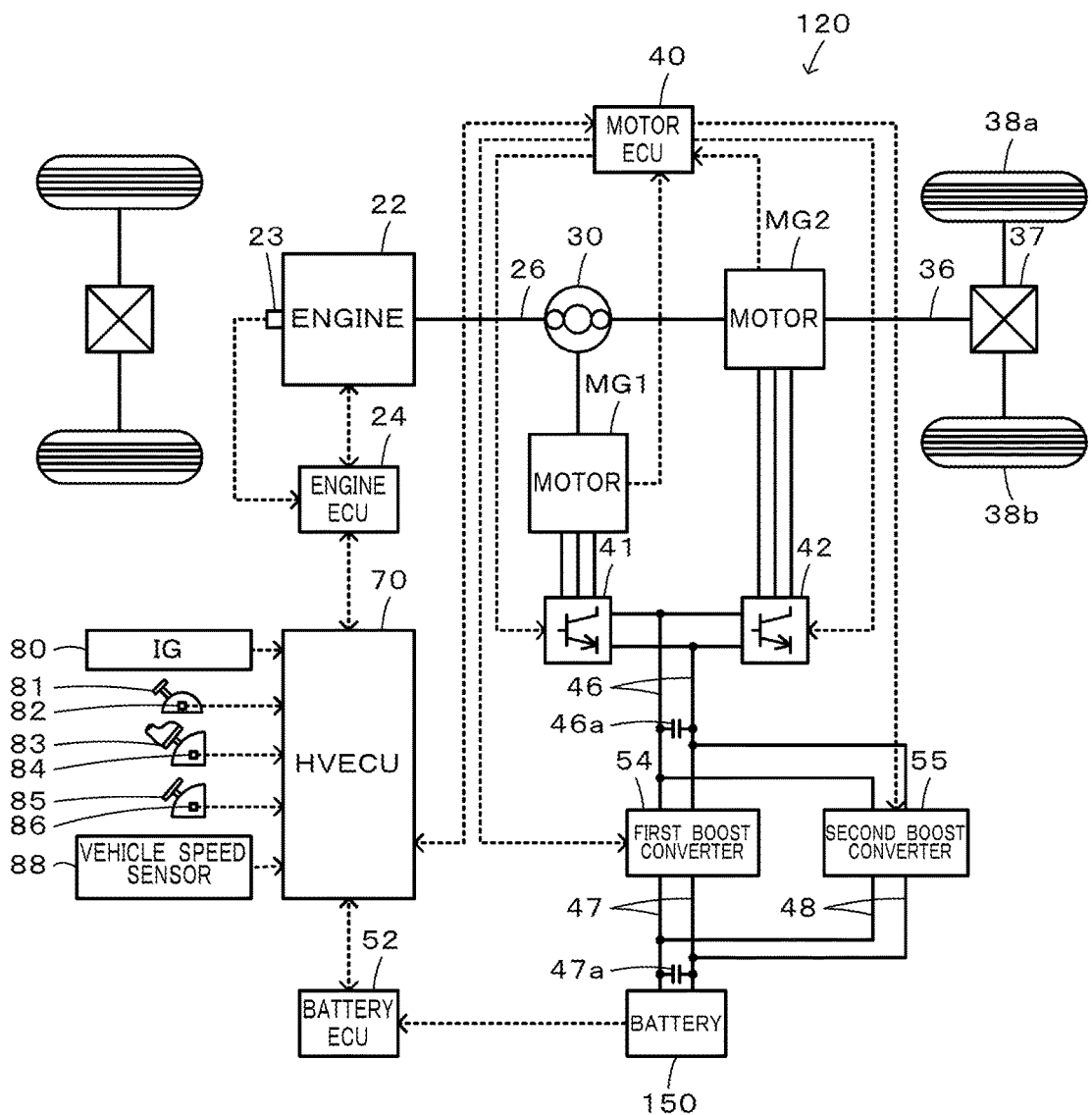
FIG. 6 is a configuration diagram illustrating the schematic configuration of a hybrid vehicle according to a modification.

The hybrid vehicle 20 of the embodiment includes the first boost converter 54 connected with the first power lines 46 which the inverters 41 and 42 of the motors MG1 and MG2 are connected with, and the second power lines 47 which the first battery 50 is connected with, and the second boost converter 55 connected with the first power lines 46 and the third power lines 48 which the second battery 51 is connected with. As shown in FIG. 6, the present disclosure may also be applied to a hybrid vehicle 120 of a modification that includes a first boost converter 54 connected with first power lines 46 and second power lines 47 which a battery 150 is connected with, and a second boost converter 55 connected with the first power lines 46 and third power lines 48 which the battery 150 is connected with. In other words, the first boost converter 54 and the second boost converter 55 may be configured to be connected with a single battery.

The embodiment describes the configuration of the hybrid vehicle 20 equipped with the engine 22, the planetary gear 30, the motors MG1 and MG2, the first and the second batteries 50 and 51 and the first and the second boost converters 54 and 55. The present disclosure may also be applied to a configuration of a one-motor hybrid vehicle that includes an engine, one motor, first and second batteries and first and second boost converters or to another configuration of a one-motor hybrid vehicle that includes an engine, one motor, a single battery and first and second boost converters. The present disclosure may further be applied to a configuration of an electric vehicle that includes a motor, first and second batteries and first and second boost converters without an engine or to another configuration of an electric vehicle that includes a motor, a single battery and first and second boost converters.

In the embodiment or the modification described above, a lithium ion rechargeable battery or a nickel metal hydride battery is employed as the first battery 50, the second battery 51 or the battery 150. The first battery 50, the second battery 51 or the battery 150 may be any power storage device that is chargeable, for example, a capacitor.

In the motor vehicle of the above aspect, in the process of cancelling shutdown of the second converter while the first converter steps up a voltage of an electric power of the second power line and supplies the electric power of the stepped-up voltage to the first power line in the shutdown state of the second converter, the control device may perform the single element switching control to switch one switching element forming a lower arm between the third and the fourth switching elements of the second converter while setting the other switching element forming an upper arm off. This configuration does not set the switching element forming the upper arm in the on position. This suppresses electric current from flowing in the second reactor in a reverse direction (i.e., in a regeneration direction) by the voltage of the first power line and accordingly causes the electric current flowing in the second reactor to increase from the value 0 in the power running direction. In the motor vehicle of this configuration, the control device may perform the single element switching control to gradually reduce a duty cycle of the second converter from a value 1 until the electric current flowing in the second reactor becomes equal to the target current. This configuration causes the electric current flowing in the second reactor to gradually increase from the value 0 in the power running direction to the target current.

In the motor vehicle of the above aspect, in the process of cancelling shutdown of the second converter while the first converter steps down a voltage of an electric power of the first power line and supplies the electric power of the stepped-down voltage to the second power line in the shutdown state of the second converter, the control device may perform the single element switching control to switch one switching element forming an upper arm between the third and the fourth switching elements of the second converter while setting the other switching element forming a lower arm off. This configuration does not set the switching element forming the lower arm in the on position. This suppresses electric current from flowing in the second reactor in a reverse direction (i.e., in a power running direction) by the voltage of the third power line and accordingly causes the electric current flowing in the second reactor to increase from the value 0 in the regeneration direction. In the motor vehicle of this configuration, the control device may perform the single element switching control to gradually increase a duty cycle of the second converter from a value 0 until the electric current flowing in the second reactor becomes equal to the target current. This configuration causes the electric current flowing in the second reactor to gradually increase from the value 0 in the regeneration direction to the target current.

In the motor vehicle of the above aspect, the power storage device may include a first power storage device connected with the second power line, and a second power storage device connected with the third power line. In other words, the first converter and the second converter may be respectively connected with two power storage devices or may be connected with one single power storage device.

The following describes the correspondence relationship between the primary elements of the above embodiment and the primary elements of the disclosure described in Summary. The motor MG2 of the embodiment corresponds to the "motor", the first battery 50 and the second battery 51 correspond to the "power storage device", the first boost converter 54 corresponds to the "first boost converter", and the second boost converter 55 corresponds to the "second boost converter".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The disclosure is applicable to, for example, the manufacturing industries of motor vehicles.

The invention claimed is:
1. A motor vehicle, comprising:
a motor for driving;
a power storage device;
a first converter connected with a first power line which the motor is connected with, and a second power line which the power storage device is connected with, the first converter including first and second switching elements, first and second diodes and a first reactor and being configured to transmit electric power between the first power line and the second power line through voltage conversion;

a second converter connected with the first power line and a third power line which the power storage device is connected with and which is different from the second power line, the second converter including third and fourth switching elements, third and fourth diodes and a second reactor and being configured to transmit electric power between the first power line and the third power line through voltage conversion; and a control device configured to perform voltage control of the first converter such that a voltage of the first power line becomes equal to a target voltage and to perform current control of the second converter such that an electric current flowing in the second reactor becomes equal to a target current, wherein in a process of cancelling shutdown of the second converter during transmission of electric power between the first power line and the second power line through the voltage conversion by the first converter in a shutdown state of the second converter, the control device performs single element switching control that switches on one switching element between the third and the fourth switching elements of the second converter while setting the other switching element off, to prevent the electric current from flowing in the second reactor in reverse to a current flow direction in the first reactor.

2. The motor vehicle according to claim 1,
wherein in the process of cancelling shutdown of the second converter while the first converter steps up a voltage of an electric power of the second power line and supplies the electric power of the stepped-up voltage to the first power line in the shutdown state of the second converter, the control device performs the single element switching control to switch on the one switching element forming a lower arm between the third and the fourth switching elements of the second converter while setting the other switching element forming an upper arm off.

3. The motor vehicle according to claim 2,
wherein the control device performs the single element switching control to gradually reduce a duty ratio of the second converter from a value 1 until the electric current flowing in the second reactor becomes equal to the target current.

4. The motor vehicle according to claim 3,
wherein the power storage device includes a first power storage device connected with the second power line, and a second power storage device connected with the third power line.

5. The motor vehicle according to claim 2,
wherein the power storage device includes a first power storage device connected with the second power line, and a second power storage device connected with the third power line.

6. The motor vehicle according to claim 1,
wherein in the process of cancelling shutdown of the second converter while the first converter steps down a voltage of an electric power of the first power line and supplies the electric power of the stepped-down voltage to the second power line in the shutdown state of the second converter, the control device performs the single element switching control to switch on the one switching element forming an upper arm between the third and the fourth switching elements of the second converter while setting the other switching element forming a lower arm off.

7. The motor vehicle according to claim 6,
wherein the control device performs the single element switching control to gradually increase a duty ratio of the second converter from a value 0 until the electric current flowing in the second reactor becomes equal to the target current.

8. The motor vehicle according to claim 7,
wherein the power storage device includes a first power storage device connected with the second power line, and a second power storage device connected with the third power line.

9. The motor vehicle according to claim 6,
wherein the power storage device includes a first power storage device connected with the second power line, and a second power storage device connected with the third power line.

10. The motor vehicle according to claim 1,
wherein the power storage device includes a first power storage device connected with the second power line, and a second power storage device connected with the third power line.

* * * * *